United States Patent [19]

Gregg

[11] Patent Number: 5,003,558
[45] Date of Patent: Mar. 26, 1991

[54] DATA SYNCHRONIZING BUFFERS FOR DATA PROCESSING CHANNELS

[75] Inventor: Thomas A. Gregg, Highland, N.Y.

[73] Assignee: International Business Machines Corporation, Armonk, N.Y.

[21] Appl. No.: 428,797

[22] Filed: Oct. 30, 1989

[51] Int. Cl.$^5$ .............................................. H04L 7/00
[52] U.S. Cl. ..................................... 375/108; 375/118
[58] Field of Search ............... 375/112, 118, 119, 108; 370/102, 105.3

[56] References Cited

U.S. PATENT DOCUMENTS

| | | |
|---|---|---|
| 3,134,962 | 5/1964 | Froehlich . |
| 4,071,887 | 1/1978 | Daly et al. ........................... 364/200 |
| 4,395,756 | 7/1983 | Daniels ................................. 364/200 |
| 4,410,942 | 10/1983 | Milligan et al. ..................... 364/200 |
| 4,596,026 | 6/1986 | Cease et al. ......................... 375/118 |
| 4,686,690 | 8/1987 | Sato ...................................... 375/118 |
| 4,748,588 | 5/1988 | Norman et al. ..................... 364/900 |
| 4,764,941 | 8/1988 | Choi ..................................... 375/112 |
| 4,811,340 | 3/1989 | McEachern et al. ............... 375/118 |

OTHER PUBLICATIONS

IBM Technical Disclosure Bulletin, vol. 24, No. 8, 1/82, pp. 4404–4406, Asynchronous Multi-Clock Bidirectional Buffer Controller.

Primary Examiner—Douglas W. Olms
Assistant Examiner—Marianne Huseman
Attorney, Agent, or Firm—Floyd A. Gonzalez

[57] ABSTRACT

A synchronizing buffer which synchronizes data link data with the channel clock such that one character is transmitted onto the data link for each channel clock. The synchronizing buffer disclosed includes a first-in-first-out (FIFO) buffer which receives data characters from a data channel buffer, and outputs them onto the data link. When the channel clock is stopped, the synchronizing buffer circuit places idle characters on the data link with the proper disparity. When the channel clock restarts, the circuit synchronizes the sending of restarted data characters with the idle characters placed onto the link such that there is an intelligible string of characters on the data link at all times.

12 Claims, 5 Drawing Sheets

DATA SYNCHRONIZING BUFFERS FOR DATA PROCESSING CHANNELS

BACKGROUND OF THE INVENTION

The present invention relates to channels for data processing systems providing data transfers between the data processing systems and connected data links, and more particularly relates to a synchronizing circuit for synchronizing data transfers from a data processing channel onto a data link.

The transfer of data over a data link by a data processing system may be either in a start-stop mode in which the data link is operated in an asynchronous manner with the data message over the link being proceeded by a special start character and ended by a special stop character, or in a synchronous mode wherein both the sender and the receiver are operated in synchronism with one another with a message being proceeded by a special synchronizing bit or character pattern. In the data link of the present invention, both the sender and the receiver are kept in continuous synchronous operation by always transmitting intelligible data characters over the link. When message frames are not being transmitted, idle characters are transmitted to keep the data link in synchronism. Since the sender and the receiver at either end of the data link do not always operate in exact synchronism with the data link, it is necessary to provide a pair of data synchronizing buffers, one between the data sender and the data link, and one between the data receiver and the data link.

IBM Technical Disclosure Bulletin article "Asynchronous Multi-Clock Bidirectional Buffer Control" by Brent et al (Vol. 24, No. 8, January 1982) page 4404, discusses a system which serves to synchronize transfers bidirectionally between two relatively asynchronous systems having different width data transfer interfaces.

U.S. Pat. No. 3,134,962 issued May 26, 1964 to Froehlich for "Serial Buffer", discloses a serial buffer which provides for the transmission of binary, digital data signals in serial form. The disclosed apparatus provides buffering means for matching an unsynchronized source to a synchronized transmission system, namely telephone lines operated at a fixed standard bit rate between transmitting and receiving stations.

U.S. Pat. No. 4,071,887 issued Jan. 31, 1978 to Daly et al for "Synchronous Serial Data Adapter", discloses an integrated circuit synchronous data adapter providing a bidirectional interface for synchronous data interchange. The disclosed adapter includes internal control and interface logic including a first-in-first-out (FIFO) buffer memory for enabling simultaneous transmitting and receiving of standard synchronous communication characters to allow data transfer between serial data channels and the parallel bidirectional data bus of a bus organized system such as a microprocessor system.

U.S. Pat. No. 4,395,756 issued July 26, 1983 for "Processor Implemented Communications Interface Having External Clock Actuated Disabling Control" to Daniels, discloses an automated mailing system having a peripheral controller interface establishing communication links with peripheral devices, and an incompatible systems interface interconnecting a serial communications bus of the system processor and the peripheral controller interface. A flip-flop is provided to disable the incompatible systems processor to accommodate timing constraints of the serial communications bus for receipt of data signals.

U.S. Pat. No. 4,410,942 issued Oct. 18, 1983 for "Synchronizing Buffered Peripheral Subsystems to Host Operations" by Milligan et al, discloses a peripheral device subsystem which enables its peripheral devices to operate asynchronously with respect to attached hosts through use of manage buffers, new multiple data transfer modes, control and error recovery operations.

U.S. Pat. No. 4,686,690 issued Aug. 11, 1987 for "Synchronous Data Receiver Circuit" to Sato, discloses a synchronous data receiver circuit which, after temporarily storing received data in a data memory having a large enough capacity to store at least two frames, detects a frame synchronization signal pattern with a pattern match circuit, then stores the message data of the receive data in a data buffer.

U.S. Pat. No. 4,748,588 issued May 31, 1988 to Norman et al for "Fast Data Synchronizer", discloses a circuit arrangement for synchronizing source data from a source system with a clock from a sync system. The data synchronizer functions as a first-in-first-out (FIFO) buffer. Read and write counters are provided to affect data transfer, and are implemented as ring counters or gray code counters. By utilizing ring counters or gray code counters, glitchless detection of counter states is achieved. A detection circuit compares the state of the read and writer counters to determine if data to be synchronized exists in the buffer, and if empty buffer positions are available for additional data.

SUMMARY OF THE INVENTION

The present invention provides data synchronizing buffers for data processing channels which synchronizes the transfer of data over a data link with an asynchronously operating data channel of a data processing system. A first-in-first-out (FIFO) circuit is utilized which is filled by a channel clock and unloaded by a clock for transmitting data over the data link. An idle generator is provided which, if the channel clock stops, places idle characters on the data link, and if the channel clock restarts, stops sending idle characters and resumes sending data characters from the data channel. Further, synchronizing control circuits are provided which maintains the running disparity at their proper values during the stop and restart operations.

It is thus a primary object of the present invention to provide a synchronizing buffer which synchronizes data transfers from an asynchronously operating data processing channel to a data link.

It is a further object of the present invention to provide a circuit for placing idle characters on the data link when the channel clock stops.

It is a further object of the present invention to provide a data synchronizing buffer which stops sending idles over the data link and restarts sending data characters from the data processing channel when the channel clocks restarts.

It is a further object of the present invention to provide disparity controlling circuitry for providing proper running disparity during the transition from data characters to idle characters back to data characters during the stop and restart operation.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
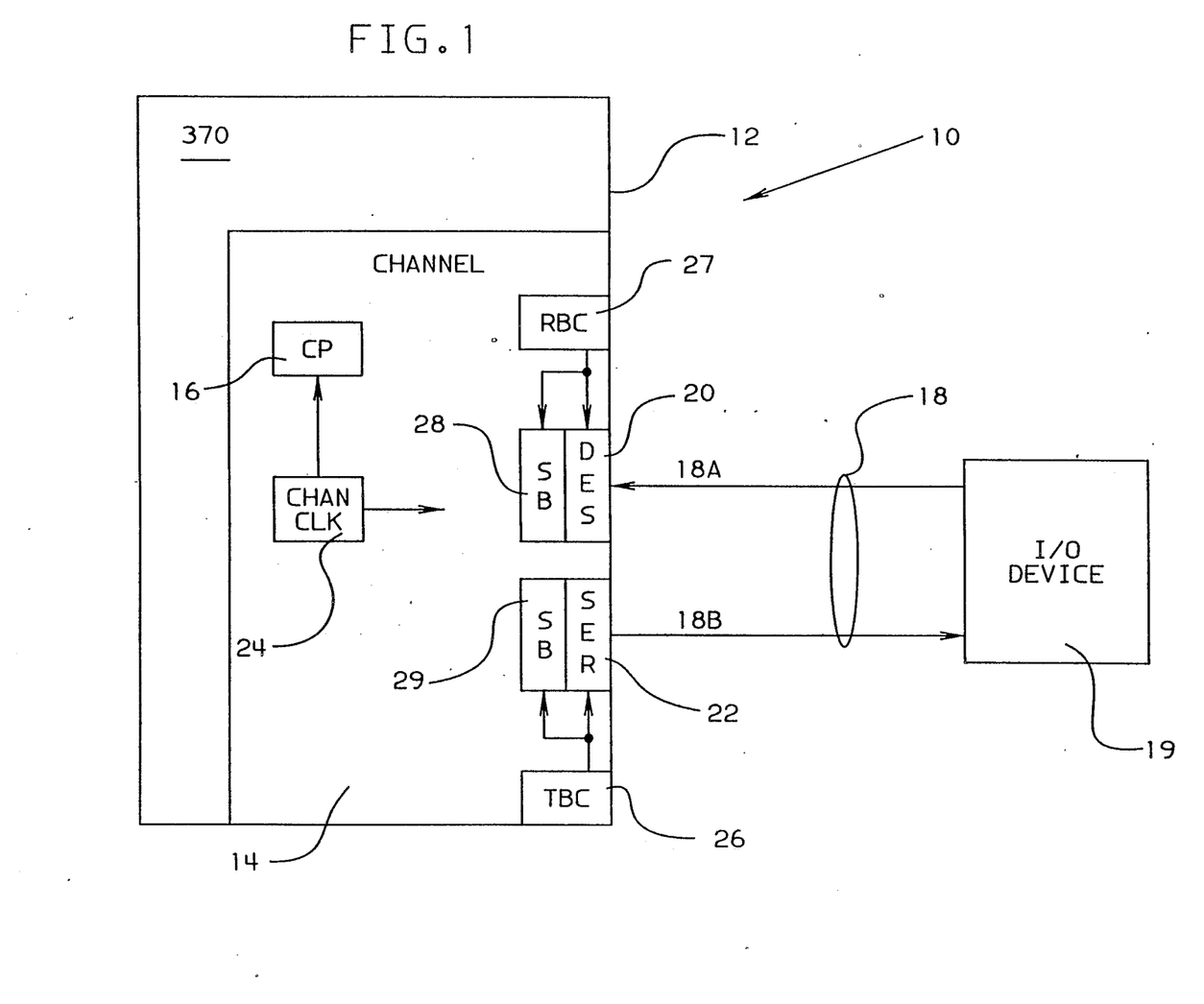
FIG. 1 is an overall view of a data processing system having a channel, a data link, and an inbound synchronizing buffer and an outbound synchronizing buffer between the channel and the data link.

FIG. 1 is an overall view of a data processing system 10 usable with the present invention. The data processor system 10 includes a computer 12 such as an IBM System/370 machine, which further includes one or more channels 14 having data input and output capabilities. The channel 14 may be controlled by a channel processor 16, as is well known. The channel 14 has a data link 18 for receiving data from and sending data to an input/output device 19. In the preferred embodiment, the data link 18 includes an input line 18A for transmitting the data between the device 19 and the channel 14, and an output line 18B for transmitting data from the channel 14 to the device 19. The input line 18A in connected to a deserializer circuit 20, and a serializer circuit 22 is provided at the output of the channel 14 to serialize data and place it on the output line 18B. The serializer/deserializer circuits 22 and 20 may be designed in accordance with the serializer/deserializer circuit disclosed in U.S. Pat. No. 4,901,076 issued Feb. 13, 1990; entitled "Circuit for Converting Between Serial and Parallel Data Streams by High Speed Addressing", assigned to Assignee of the present invention.

The channel 14 and its channel processor 16 are controlled by a channel clock 24, and the serializer/deserializer circuits 22 and 20 and the associated data transmission functions are controlled by a transmission byte clock (TBC) 26 and a reception byte clock (RBC) 27. Since the clocks 24, 26 and 27 do not run at the identical speeds, it is necessary to provide synchronizing buffers 28 and 29 between the hardware of the channel 14 and the serializer/deserializer circuits 22 and 20. In the present embodiment, the channel clock 24 runs at the same speed or slightly faster than the TBC 26 and RBC 27. Thus, the outbound synchronizing buffer 29 may be loaded by the channel 14 faster than it can be unloaded by the serializer 22 for transmission over the outbound line 18B to the I/0 device 19 likewise for inbound. The outbound synchronizing buffer 29 includes the capability of providing a stop signal to the channel processor 16 to stop loading data into the synchronizing buffer 29 until it is unloaded by the TBC 26. Also, if data is not sent by the channel 14 to the synchronizer buffer 29, the synchronizing buffer 29 places idle characters on the outbound line 18B to keep the outbound portion of the data link 18 in synchronism.

Figure 2:
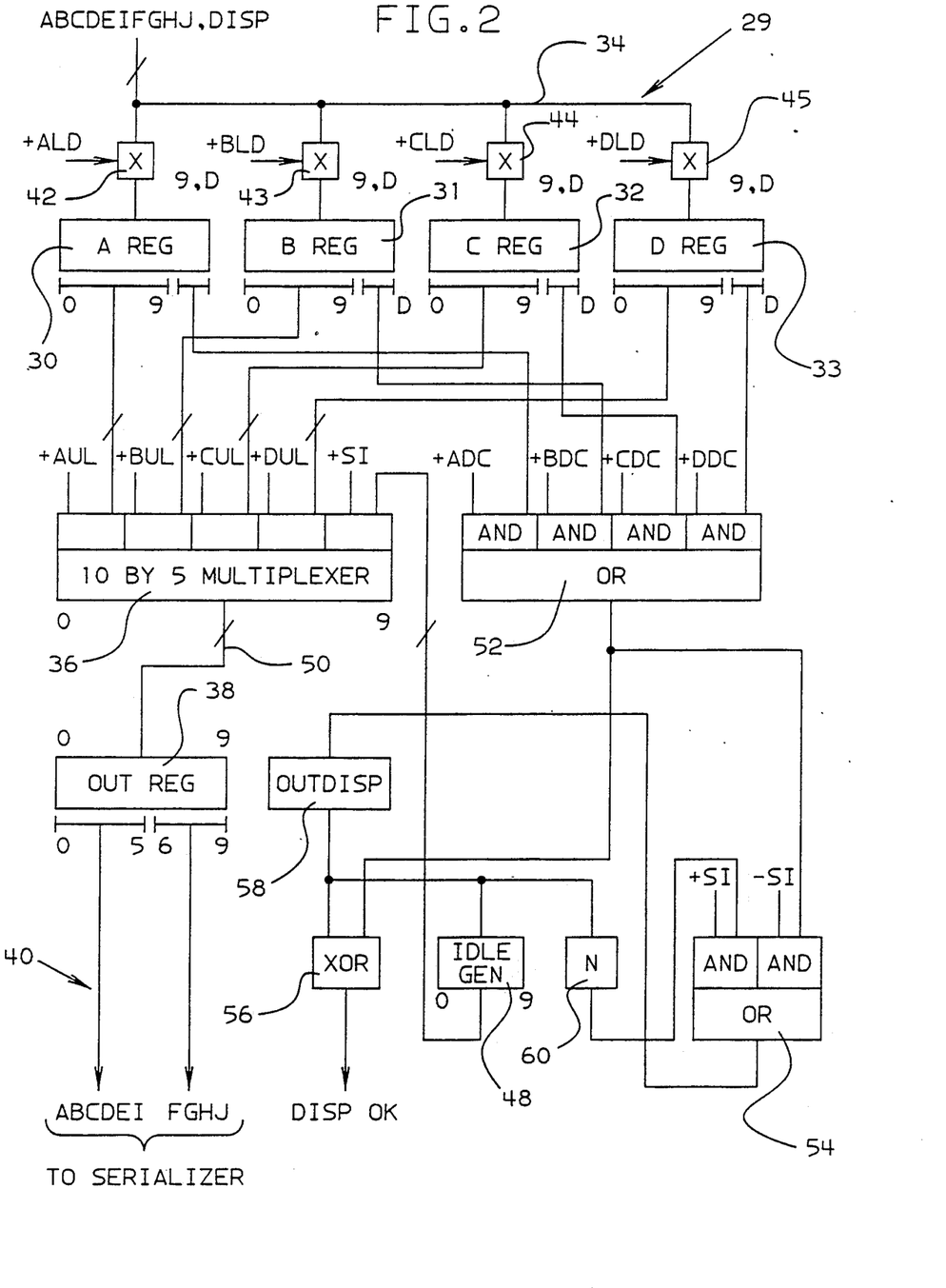
FIG. 2 is a block diagram showing the data flow through the outbound synchronizing buffer of FIG. 1.
Figure 3:
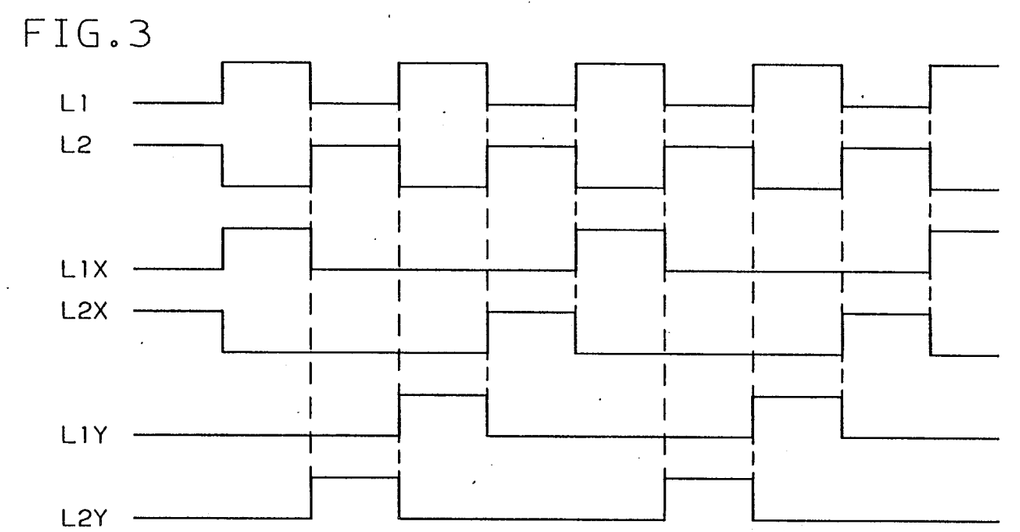
FIG. 3 is a timing diagram showing the waveforms of clocks used to drive various latches of the outbound synchronizing buffer of FIG. 1.

FIG. 2 is a block diagram showing the data flow through the outbound synchronizing buffer 29 of FIG. 1. All registers and latches of the synchronizing buffer 29 in the disclosed embodiment are level sensitive scan design LSSD shift register latches. As is known, shift register latches have an L1 and an L2 polarity hold circuit. Each polarity hold circuit has an independent L1 and L2 clock. The L1 and L2 clocks are generated from a common oscillator signal, with the L1 clock the complement of the L2 clock. The channel clock 24 is an L1/L2 pair which runs synchronous to the rest of the channel hardware. The TBC 26 is also an L1/L2 pair which runs synchronous to the serializer circuit 22. Split clocks (not shown) are generated from the normal channel and transmission byte clocks 24 and 26 by gating the normal clocks with the L1 and L2 outputs of a latch which changes state every cycle. The clock gating produces L1 and L2 clocks which are active on alternate clock cycles. The split clocks are arranged so that there is a full cycle of inactive time from the fall of the L1 clock to the rise of the L2 clock. FIG. 3 is a timing diagram of the waveforms of an L1 clock and its complement L2 clock. A first split clock L1X and L2X are shown. FIG. 3 includes a second split clock L1Y and L2Y, whose use will be explained hereinafter in connection with the sync latches 88, 89, 90 and 91 of FIG. 4A.

FIG. 2 includes four multibit character registers 30, 31, 32 and 33 which, together, form a first in first-out (FIFO) circuit for loading multibit characters from a parallel bus 34. The characters are unloaded from the FIFO circuit through a multiplexor 36 to an output register 38 which is connected to a parallel output bus 40 for transmitting parallel data bits to the serializer circuit 22 of FIG. 1. The multibit character on the input bus 34 from the channel 14 may be 10 bit characters with a single running disparity bit coded in accordance with the scheme explained in U.S. Pat. No. 4,486,739 to Franaszek et al, and assigned to the assignee of the present invention. Access to the registers 30 through 33 is controlled by gates 42, 43, 44 and 45, respectively which are enabled by loading signals +ALD, +BLD, +CLD and +DLD, respectively. The ten bits designated A, B, C, D, E, I, F, G, H, J of the characters loaded in the registers 30 through 33 are passed through a 10 by 5 multiplexor 36. The multiplexor 36 is enabled by unload signals +AUL, +BUL, +CUL and +DUL for unloading data characters in the registers 30 through 33, respectively. An idle character generated by an idle generator 48, to be discussed further, is also multiplexed through the multiplexor 36 by a send idle signal +SI. A ten bit bus 50 provides the ten character bits passed through the multiplexor 36 to the output register 38 such that the character bits may be supplied to the serializer circuit 22 over output bus 40, as previously explained.

The running disparity bits of each character stored in the FIFO registers 30 through 33 are stored in the last bit position of the registers, and are provided to a 2 by 4 AND/OR circuit 52. Each disparity bit is provided to an AND gate in the circuit 52 with its respective disparity check signal +ADC, +BDC, +CDC, and +DDC. It will be understood that only one AND gate of the circuit 52 is enabled at a time, and that the output of the circuit 52 will have the value of the running disparity associated with data character interrogated by the last disparity check signal. The output of the 2 by 4 AND-/OR circuit 52 is provided to one AND gate of a 2 by 2 AND/OR circuit 54 and one input of an Exclusive-OR gate 56. The output of the 2 by 2 AND/OR circuit 54 is connected to the input of a one bit latch 58 labeled OUTDISP. The output of the OUTDISP latch 58 is provided to one input of the Exclusive-OR gate 56, to an input of the idle generator 48, and through an inverter 60 to one input of the second AND gate of the 2 by 2 AND/OR circuit 54. The disparity bit from the OUTDISP latch 58 which is inputted to the idle generator 48 determines which one of two idle characters are generated by the idle generator 48 and inputted to the multiplexor 36. As explained in the aforementioned Franaszek patent, two versions of a special idle character may be generated such that the running disparity of a string of data characters is kept around zero. The inverted OUTDISP bit from inverter 60 is ANDed with the mentioned send idle signal +SI. The running disparity bit of the last loaded character from the circuit 52 is ANDed with a not send idle signal −SI. The output of the Exclusive-OR gate 56 provides a DISP OK signal, whose use will be explained later. The output register 38 and the OUTDISP latch 58 are both clocked by the TBC 26. It will thus be understood that the DISP OK signal from the Exclusive-OR gate 56 will be enabled only when the OUTDISP latch 58 contains the complement of the last disparity bit from the circuit 52.

Figure 4A:
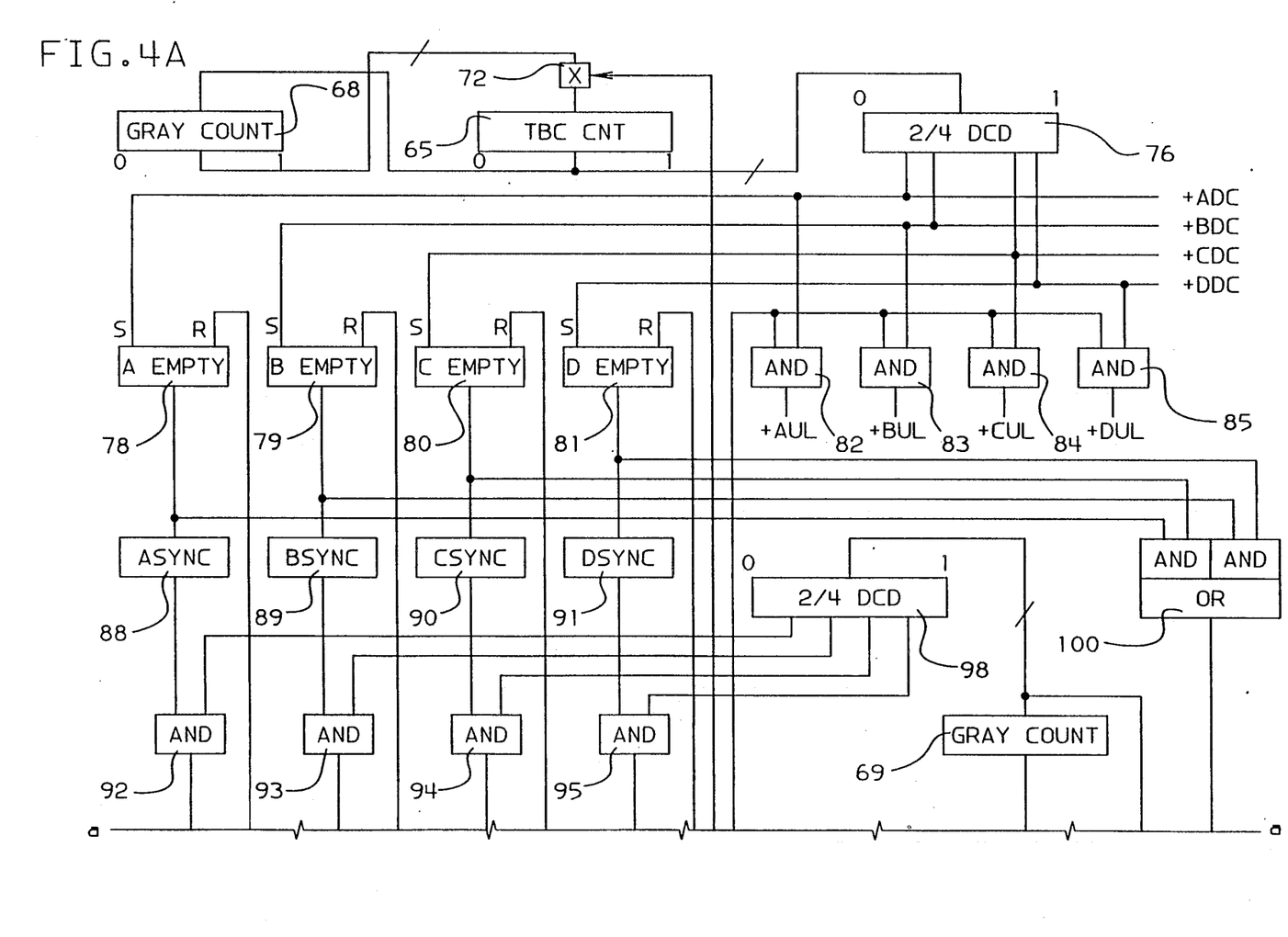
FIGS. 4A and 4B, joined along line a—a, form a block diagram of the control circuit of the outbound synchronizing buffer of FIG. 1.
Figure 4B:
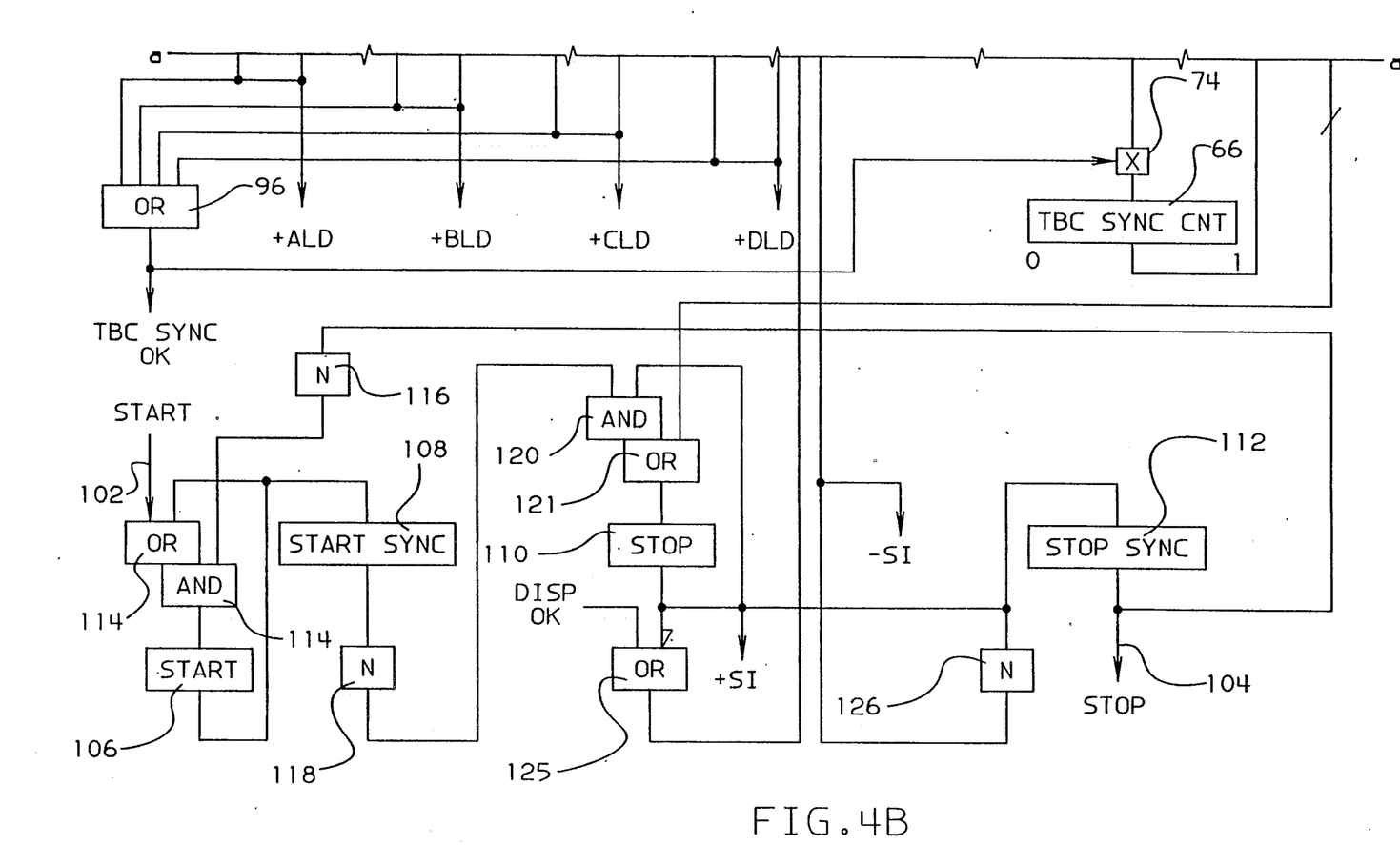

FIGS. 4A and 4B, joined along line a—a, form a block diagram of the control circuit of the synchronizing buffer 29 of FIG. 1. The control circuit of FIGS. 4A and 4B contain a TBC counter latch 65 which is clocked by the TBC 26 of FIG. 1; and a TBC sync counter latch 66 which is clocked by the channel clock 24 of FIG. 1. Each of the latches 65 and 66 is a two bit latch which is compatible with the number of registers 30 through 33 of FIG. 2. It will be understood that if more data registers were included in the FIFO of circuit 29, the latches 65 and 66 would need to count to a correspondingly higher value. Each of the latches 65 and 66 has its output connected to the gray count decoders 68 and 69, respectively, whose outputs are connected to the inputs of the latches 65 and 66 through gates 72 and 74, respectively. This circuit configuration provides for stable counters whose values may be interrupted and restarted by enabling gates 72 and 74, respective. For this reason, latches 65 and 66 will be referred hereinafter as counters. It will be understood that the TBC counter 65 counts the TBC clocks when enabled, and that the TBC sync counter 66 counts the channel clocks when enabled by gate 74.

The output of the TBC counter 65 is connected to a 2 to 4 decoder 76, whose outputs provide the +ADC, +BDC, +CDC and +DDC signals mentioned in connection with FIG. 2. The outputs of the decoder 76 are also connected to the set inputs of set/reset latches 78, 79, 80 and 81, respectively. It will be understood that the latches 78 through 81 indicate whether the registers 30 through 33 of FIG. 1 are empty. Each of the latches 78 through 81 is set when its corresponding register 30 through 33 is empty, and is reset when its corresponding register 30 through 33 is loaded with a data word, as previously described. Also, the outputs of the decoder 76 are connected to one input of the AND gates 82, 83, 84 and 85, respectively. The AND gates 82 through 85 are enabled by a degating signal, to be described. The output of the AND gates 82 through 85 provides the unload signals +AUL, +BUL, +CUL and +DUL, respectively, as discussed in connection with FIG. 1.

The outputs of the empty latches 78 through 81 are connected to synchronizing latches 88, 89, 90 and 91, respectively. The synchronizing latches 88 through 91 are clocked by split channel clocks to synchronize the empty signals from the latches 88 through 91 to the channel clock 24. The design of the synchronizing latches 88 through 91 will be discussed further in connection with FIG. 5. The outputs of the synchronizing latches 88 through 91 are connected to one input of the AND gates 92, 93, 94 and 95, respectively. The output of the TBC sync counter 66 is connected to a 2 to 4 decoder 98 whose outputs are connected to the other inputs of the AND gates 92 through 95, respectively. It will be understood that as the TBC sync counter 66 counts, the AND gates 92 through 95 will be enabled sequentially in order by the outputs of the decoder 98. The outputs of the AND gates 92 through 95 are connected to the inputs of the multi-input OR gate 96 whose output provides a TBC SYNC OK signal. The TBC SYNC OK signal informs the channel processor 16 that the outbound synchronizing buffer 29 is ready to receive another data character. The output of the OR gate 96 is also connected to the gate 74 which enables the TBC sync counter 66 to advance the value in the gray count register 69 and energize the next output of the decoder 98, as previously described. The outputs of the AND gates 92 through 95 provide the load signals +ALD, +BLD, +CLD and +DLD, respectively, which were discussed in connection with FIG. 2. The outputs of AND gates 92 through 95 are also connected to the reset terminals of the empty latches 78 through 81, respectively, to reset the latches 78 through 81 when their corresponding data registers 30 through 33 are loaded by their respective load signals.

The outputs of the empty latches 78 through 81 are connected to the AND gate inputs of a 2 by 2 AND/OR circuit 100 in such a way that the output of the circuit 100 is enabled when a sequence of three or more of the empty latches are set. As shown in FIG. 4A, the outputs of the A empty latch 78 and the C empty latch 80 is connected to a first AND gate of the 2 by 2 AND/OR circuit 100 and the output of the B empty latch 79 and the D empty latch 81 is connected to the inputs of the second AND gate of the 2 by 2 AND/OR circuit 100. Thus, if A register 30 and C register 32 are both empty or B register 31 and D register 33 are both empty, the output of the circuit 100 is enabled. The circuit 100 detects if either a channel stop clock condition exists or some invalid out of sequence states of the empty latches 78–81 exist.

The control circuit of FIGS. 4A and 4B further includes an input 102 for receiving start commands from the channel processor 16 and an output terminal 104 for providing a stop signal to the channel processor 16 when a stop condition is detected by the control circuit. A start latch 106 is clocked by the channel clock 24, and a start sync latch 108 is clocked by the TBC split clock. A stop latch 110 is provided which is latched by the TBC clock 26 and a stop sync latch 112 is clocked by the channel split clock. The start latch 106 latches the start signal from input 102 which is inputted to an OR gate 114 whose output is inputted into an AND gate 115. The AND gate 115 is enabled by the output of the stop sync latch 112 which has been inverted by an inverter 116. The output of the start latch 106 is connected to the second input of the OR gate 114, and is also connected to the input of the start sync latch 108. The output of the start sync latch 108 is inverted by an inverter 118 whose output is connected to one input of an AND gate 120. The output of the AND gate 120 is connected to one input of an OR gate 121 whose output is connected to the input of the stop latch 110. The output of the stop latch 110 is connected to a second input of the AND gate 120, and is connected to the input of the stop sync latch 112. The output of the stop latch 110 is the send idle signal +SI which passes idle characters produced by the idle generator 48 through the multiplexor 36 into the output register 38, as discussed in connection with FIG. 2. The output of the stop latch 110 is connected to an inverted input of an OR gate 125 which has a non-inverted input for receiving the DISP OK signal outputted from the Exclusive-OR gate 56 of FIG. 2. The output of the AND gate 125 is connected to the gate 72 to enable to TBC counter 65 thereby advancing the output signals of the decoder circuit 76. It will thus be understood that the TBC counter 65 starts to count when the disparity is okay or when the channel clock is not stopped. The output of the stop latch 110 is also inverted by an inverter 126. The output of the inverter 126 is used to degate the unload signals by enabling the AND gates 82 through 85. The output of the inverter 126 also provides the not send idle signal −SI, which is connected to the 2 by 2 AND/OR circuit 54 of FIG. 2. It will thus be understood that the unload signals from the AND gates 82 through 85 through their corresponding inputs of the multiplexor 36 are enabled when the channel clock is not stopped (the not send idle signal −SI is enabled).

The control circuit of FIGS. 4A and 4B is started for the normal operating mode, either initially or after certain retry operations, by a signal from the channel processor 16 to the input terminal 102. At the next channel clock, the start signal is latched in the start latch 106. At the next TBC split clock, the start signal is latched in the start sync latch 108 whose inverted condition resets the stop latch 110 at the next TBC clock. With the stop latch 110 thus reset, the OR gate 125 is turned on to enable the counter 65. With the synchronizing buffer 29 in the operating mode, data characters are loaded into the FIFO registers 30 through 33 by channel clocks, and unloaded by TBC clocks, and the running disparity of the data character being unloaded is latched into the OUTDISP latch 58 through the circuit 100 by the enabled −SI signal.

As described previously, a channel stop clock condition is detected by the 2 by 2 AND/OR circuit 100, which turns on the OR gate 121, in turn setting the stop latch 110 at the next TBC clock. In the channel stop clock condition, the send idle signal +SI is enabled, and the not-send idle signal −SI is disabled. The last running disparity bit latched into the OUTDISP latch 58 will be used by the idle generator 48 to generate an idle character with the proper disparity to be placed in the output register 38 through the multiplexor 36 by the now enabled +SI signal. The inverter 60 inverts the disparity bit from the OUTDISP latch 58, which is then passed through the circuit 54 by the enabled +SI signal to be latched in the OUTDISP latch 58 at the next TBC clock. Thus, the disparity bit will be forced to alternate between zero and one, alternating the idle character being generated by the idle generator 48. Thus, after a channel stop clock condition is detected, idle characters of the proper disparity are placed on the outbound link 18B. The receiving end of the link 18B does not detect any code violations as a result of a channel stop clock condition; however, if the channel stop clock condition occurs within a frame transmission, a truncated frame may be detected.

After certain scan and/or recovery actions, the channel clock 24 is restarted. As previously described, the control logic starts to generate the TBC SYNC OK signal to purge any remaining frame data. Typically, after frame data is purged, idle characters are sent by the channel processor 16 to the outbound synchronizing buffer 29 via the parallel bus 34 of FIG. 1. During this time, referred herein as the restart mode, the stop latch 110 remains set. Also during restart mode when the disparity is correct, as determined by the Exclusive-OR gate 56, new data characters are loaded in the FIFO data registers 30 through 33 as the TBC counter 65 is enabled. However, during this time, the unload signals are disabled by the disabled −SI signal, and the characters in the FIFO register 30 through 33 are discarded. Also during restart, idle characters of the proper disparity are multiplexed to the output register 38 by the enabled +SI signal. It will be understood that even though the data characters are being discarded, their disparity bits are being examined by the Exclusive-OR gate 56. When the disparity bit from the idle generator 48 which has been latched into the OUTDISP latch 58 agrees with the running disparity bit of the last interrogated character (that is, the latched bit has one condition, and the character bit has the opposite condition) the DISP OK signal is enabled, and the disparity of the idle characters generated by the idle generator 48 is in synchronism or aligned with the running disparity of the characters in the data registers 30 through 33.

It will be understood, that if the disparities do not agree the DISP OK signal will be disabled, disabling the TBC counter 65, thereby causing the TBC counter 65 to stop until the disparities are aligned. After waiting a proper time to allow the disparities to align as described, the channel processor 16 resets the stop latch 110 by sending a start signal to the input terminal 102, thereby returning the outbound synchronizing buffer 29 to its normal operating mode.

Figure 5:
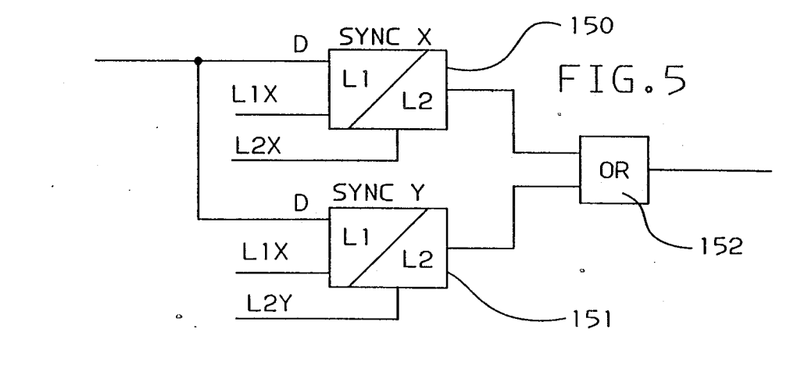
FIG. 5 is a block diagram showing the construction of one of the synchronizing latches of FIG. 4A.

FIG. 5 shows the construction of one of the sync latches 88 through 91. Each of the sync latches 88 through 91 contains a pair of L1/L2 latches 150 and 151. The latch pairs 150 and 151 are connected in parallel such that data is inputted to the D input of the L1 latches simultaneously. The L1 latch of the pair 150 is clocked by the L1X split clock of FIG. 3. The L2 latch of pair 150 is clocked by the L2X clock of FIG. 3. As shown, the L1 latch of the pair 151 is clocked by the L1Y clock of FIG. 3, and the L2 latch of pair 151 is clocked by the L2Y clock of FIG. 3. The outputs of the latch pairs 150 and 151 are connected to an OR gate 152 whose output provides the output of its respective sync latch. Thus, the pairs of latches 150 and 151 use different split clock pairs which are offset from each other by one clock cycle. As explained, both latches of the pairs 150 and 151 have the same data input and the outputs are ORed by OR gate 152. The resulting structure samples and asynchronous signal every clock cycle, while expanding the metastability wait times between the L1 and L2 clocks of FIGS. 3A and 3B, respectively.

The depth of the FIFO is dependent on the metastability wait time of the sync latches 88 through 91. Table 1 shows the latches of FIGS. 2, and 4A and 4B, and tabulates the number of bits contained in the latches and their clocks.

TABLE 1

| Name | # Bits | Clock |
| --- | --- | --- |
| A REG | 11 | CHANNEL |
| B REG | 11 | CHANNEL |
| C REG | 11 | CHANNEL |
| D REG | 11 | CHANNEL |

TABLE 1-continued

| Name | # Bits | Clock |
| --- | --- | --- |
| OUT REG | 10 | TBC |
| OUTDISP | 1 | TBC |
| TBC CNT | 2 | TBC |
| A EMPTY | 1 | SET/RESET |
| B EMPTY | 1 | SET/RESET |
| C EMPTY | 1 | SET/RESET |
| D EMPTY | 1 | SET/RESET |
| ASYNC | 1 | CHANNEL - SPLIT |
| BSYNC | 1 | CHANNEL - SPLIT |
| CSYNC | 1 | CHANNEL - SPLIT |
| DSYNC | 1 | CHANNEL - SPLIT |
| TBC SYNC CNT | 2 | CHANNEL |
| START | 1 | CHANNEL |
| START SYNC | 1 | TBC - SPLIT |
| STOP | 1 | TBC |
| STOP SYNC | 1 | CHANNEL - SPLIT |

It will be understood that the inbound synchronizing buffer 25 of FIG. 1 may be identical to the outbound synchronizing buffer 29 described in connection with FIGS. 2 through 5 without the idle generator 48 and its associated disparity checking and control circuits.

It will further be recognized that other technologies rather than the LSSD circuits used for the disclosed synchronizing buffers may be used. Further, the running disparity value of the data characters may be calculated by appropriate circuitry rather than storing a running disparity bit in each of the data registers 30 through 33.

While I have illustrated and described the preferred embodiment of my inventions, it is to be understood that I do not limit myself to the precise construction herein disclosed, and the right is reserved to all changes and modifications coming within the scope of the invention as defined in the appended claims.

Having thus described my invention, what I claim as new, and desire to secure by Letters Patent is:

1. A synchronizing buffer circuit for placing data characters from a channel onto a data link, said synchronizing buffer circuit comprising:
   a first-in-first-out (FIFO) buffer having an input for receiving data characters and an output connected to the data link;
   a first clock for filling said FIFO;
   a second clock for emptying said FIFO;
   an idle character generator connected to the output of said FIFO;
   detecting means having an input connected to said first clock, said detecting means for placing idle characters generated by said idle character generator on the data link when said detecting means detects that said first clock has stopped;
   restarting means for restarting the unloading of said FIFO when said first clock restarts; and
   disparity synchronizing means having a first input connected to said FIFO and a second input connected to said idle generator, said disparity synchronizing means for resuming placing data characters on said data link in place of said idle characters when the running disparity of said data characters is synchronized with the idle characters from said idle generator.

2. A synchronizing buffer circuit for placing data characters from a channel onto a data link, said synchronizing buffer circuit comprising:
   a first-in-first-out (FIFO) buffer having an input for receiving data characters and an output connected to the data link;
   a first clock for filling said FIFO;
   a second clock for emptying said FIFO;
   an idle character generator connected to the output of said FIFO;
   detecting means having an input connected to said first clock, said detecting means for placing idle characters generated by said idle character generator on the data link when said detecting means detects that said first clock has stopped;
   a plurality of data registers in said FIFO;
   a first counter connected to said first clock for generating sequential load signals, sequentially loading said data registers;
   a second counter connected to said second clock for generating sequential unload signals, sequentially unloading said data registers; and
   a plurality of empty registers in said FIFO, one empty register for each data register, each empty register being set by one of said load signals for indicating that its data register is empty, and being reset by one of said unload signals for indicating that is data register is not empty.

3. The synchronizing buffer of claim 2 further comprising synchronizing latch means for synchronizing the metastability weight times of said load signals and said unload signals.

4. The synchronizing buffer of claim 2 wherein said detecting means comprises gate means connected to said empty latches for detecting if at least three of said data registers are empty.

5. The synchronizing buffer of claim 4 wherein said gate means further detects if said data registers have been loaded out of sequence.

6. The synchronizing buffer of claim 5 wherein said detecting means further comprises stop latch means having an input connected to said gate means and an output connected to said second counter, said stop latch means for generating a stop signal stopping said second counter when said first counter is stopped.

7. The synchronizing buffer of claim 6 further comprising multiplexor means having inputs connected to each of said data registers, and input connected to said idle generator, multiplexor control inputs for receiving said unload signals and said stop signal such that said data registers are sequentially multiplexed through said multiplexor means when said stop latch does not generator a stop signal, and idle characters are multiplexed through said multiplexor means when said stop latch means does generate a stop signal.

8. The synchronizing buffer of claim 7 wherein said disparity synchronizing means further includes a running disparity detector for detecting the running disparity of the contents of the last data register multiplexed through said multiplexor means and said idle generator is connected to said disparity detector for generating idle characters of the opposite disparity as detected by said disparity detector.

9. The synchronizing buffer of claim 8 wherein said data registers each store a running disparity bit, said stop latch means further generates a not-send idle signal, and said running disparity detector comprises a second gate means having inputs connected to all of said data registers and an input for receiving said not-send idle signal such that the running disparity of the last data register unloaded by the unload signals is passed by said not-send idle signal through said second gate means and an OUTDISP latch connected to the output of said second gate means for latching the running disparity bit from said second gate means.

10. The synchronizing buffer of claim 9 further comprising third gate means connected between said second counter and said multiplexing means, said third gate means having an input connected to said stop latch means for blocking said unload signals from said second counter to said multiplexing means if said stop means detecting means has detected that said first clock is stopped.

11. The synchronizing buffer of claim 10 further comprising an inverter for inverting the disparity of idle characters generated by said idle generator;

fourth gate means between said second gate means and said OUTDISP latch said fourth gate means having a first input connected to the output of said second gate means, a second input for receiving said not-send idle signal from said stop latch, a third input connected to said inverter, a fourth input for receiving said send idle signal from said stop latch, and an output connected to the input of said OUTDISP latch such that when said not-send idle signal is generated, the running disparity bit from said second AND gate is passed through said fourth AND gate to said OUTDISP latch, and when said send idle signal is generated by said stop latch, the inverted disparity bit from said idle generator is passed through said fourth AND gate to said OUTDISP latch.

12. The synchronizing buffer of claim 11 further comprising a fifth gate means having a first input connected to the output of said second gate means and a second input connected to said OUTDISP latch and an output for generating a DISP OK signal when a bit latched in the OUTDISP latch has an opposite state as the bit from said second gate means; and a sixth gate means between the output of said stop latch and said second counter, said sixth gate means having a first input connected to the output of said stop latch, a second input connected to the output of said fifth gate means for receiving said DISP OK signal, and an output connected to said second counter such that said second counter is stopped when either said stop latch generates a send idle signal or said fifth AND gate does not generate said DISP OK signal thereby stopping said second counter whenever said idle generator is generating idle characters to be placed on the data link or the running disparity bit of the data character being unloaded from said FIFO is not synchronized with the idle character last placed on the data link.

* * * * *